(12) United States Patent
Muller

(10) Patent No.: US 7,819,956 B2
(45) Date of Patent: Oct. 26, 2010

(54) GAS TRANSFER MEMBRANE

(75) Inventor: Heinz-Joachim Muller, New South Wales (AU)

(73) Assignee: Siemens Water Technologies Corp., Lowell, MA (US)

( * ) Notice: Subject to any disclaimer, the term of this patent is extended or adjusted under 35 U.S.C. 154(b) by 906 days.

(21) Appl. No.: 11/571,100

(22) PCT Filed: Jun. 30, 2005

(86) PCT No.: PCT/AU2005/000961

§ 371 (c)(1),
(2), (4) Date: Dec. 21, 2006

(87) PCT Pub. No.: WO2006/002469

PCT Pub. Date: Jan. 12, 2006

(65) Prior Publication Data

US 2007/0157812 A1    Jul. 12, 2007

(30) Foreign Application Priority Data

Jul. 2, 2004    (AU) ............................... 2004903646

(51) Int. Cl.
*B01D 53/22* (2006.01)
*B01D 71/32* (2006.01)

(52) U.S. Cl. ............................. 96/6; 96/4; 96/8; 96/10; 96/11; 96/45; 96/46; 96/48; 96/50; 96/54; 210/640; 210/490; 210/500.27; 55/524; 55/DIG. 5

(58) Field of Classification Search ........................ 96/4, 96/8, 10, 11, 6; 95/45, 46, 48, 50, 54; 210/640, 210/650, 490, 500.21, 500.23, 500.27; 55/524, 55/DIG. 5
See application file for complete search history.

(56) References Cited

U.S. PATENT DOCUMENTS

| 1,994,135 A | 3/1935 | Horowitz |
| 3,228,876 A | 1/1966 | Mahon |
| 3,275,554 A | 9/1966 | Wagenaar |
| 3,556,305 A | 1/1971 | Shorr |

(Continued)

FOREIGN PATENT DOCUMENTS

DE    3904544 A1    8/1990

(Continued)

OTHER PUBLICATIONS

Supplementary EP Search Report; Application No. EP 04 75 6970; dated Jun. 25, 2007.

(Continued)

*Primary Examiner*—Jason M Greene

(57) ABSTRACT

Porous polymeric membranes formed from a hydrophobic polymer, such as halar having membrane pores of a size sufficient to permit gas and/or vapor permeation 0.05 μm to 5 μm without permitting the flow of a hydrophilic fluid across the membrane. Pore distribution is uniform and porosity is high, in some cases up to 80%. Membranes may be in the form of a flay sheet or hollow fibre for example and can be used in a variety of applications such as stripping HF gas, degassing of caustic solution, chlorine gas/alkaline filtration, degassing tap water to remove dissolved chlorine. Processes used to make such membranes can be carried out using relatively non toxic solvents such as citric acid ethyl ester or glycerol triacetate.

15 Claims, 2 Drawing Sheets

U.S. PATENT DOCUMENTS

| | | | |
|---|---|---|---|
| 3,625,827 A | 12/1971 | Wildi et al. | |
| 3,654,147 A | 4/1972 | Levin et al. | |
| 3,693,406 A | 9/1972 | Tobin, III | |
| 3,708,071 A | 1/1973 | Crowley | |
| 3,728,256 A | 4/1973 | Cooper | |
| 3,864,289 A | 2/1975 | Rendell | |
| 3,876,738 A | 4/1975 | Marinaccio et al. | |
| 3,968,192 A | 7/1976 | Hoffman, III et al. | |
| 3,992,301 A | 11/1976 | Shippey et al. | |
| 3,993,816 A | 11/1976 | Baudet et al. | |
| 4,188,817 A | 2/1980 | Steigelmann | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,218,324 A | 8/1980 | Hartmann et al. | |
| 4,230,583 A | 10/1980 | Chiolle et al. | |
| 4,247,498 A | 1/1981 | Castro | |
| 4,248,648 A | 2/1981 | Kopp | |
| 4,253,936 A | 3/1981 | Leysen et al. | |
| 4,302,336 A | 11/1981 | Kawaguchi et al. | |
| 4,340,479 A | 7/1982 | Pall | |
| 4,353,802 A | 10/1982 | Hara et al. | |
| 4,354,443 A | 10/1982 | Abrahamson | |
| 4,384,474 A | 5/1983 | Kowalski | |
| 4,385,150 A | 5/1983 | Miyake et al. | |
| 4,388,189 A | 6/1983 | Kawaguchi et al. | |
| 4,407,975 A | 10/1983 | Yamaguchi | |
| 4,431,545 A | 2/1984 | Pall et al. | |
| 4,451,369 A | 5/1984 | Sekino et al. | |
| 4,511,471 A | 4/1985 | Müller | |
| 4,519,909 A | 5/1985 | Castro | |
| 4,540,490 A | 9/1985 | Shibata et al. | |
| 4,547,289 A | 10/1985 | Okano et al. | |
| 4,609,465 A | 9/1986 | Miller | |
| 4,614,109 A | 9/1986 | Hofmann | |
| 4,618,533 A | 10/1986 | Steuck | |
| 4,623,670 A | 11/1986 | Mutoh et al. | |
| 4,623,690 A | 11/1986 | Patzschke et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis, III | |
| 4,656,865 A | 4/1987 | Callan | |
| 4,660,411 A | 4/1987 | Reid | |
| 4,670,145 A | 6/1987 | Edwards | |
| 4,673,507 A | 6/1987 | Brown | |
| 4,687,561 A | 8/1987 | Kunz | |
| 4,688,511 A | 8/1987 | Gerlach et al. | |
| 4,702,836 A * | 10/1987 | Mutoh et al. | 210/500.23 |
| 4,702,840 A | 10/1987 | Degen et al. | |
| 4,707,266 A | 11/1987 | Degen et al. | |
| 4,708,799 A * | 11/1987 | Gerlach et al. | 210/500.23 |
| 4,718,270 A | 1/1988 | Storr | |
| 4,744,240 A | 5/1988 | Reichelt | |
| 4,756,875 A | 7/1988 | Tajima et al. | |
| 4,763,612 A | 8/1988 | Iwanami | |
| 4,767,539 A | 8/1988 | Ford | |
| 4,775,471 A | 10/1988 | Nagai et al. | |
| 4,779,448 A | 10/1988 | Gogins | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,840,227 A | 6/1989 | Schmidt | |
| 4,846,970 A | 7/1989 | Bertelsen et al. | |
| 4,855,163 A | 8/1989 | Joffee et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,921,610 A | 5/1990 | Ford et al. | |
| 4,931,186 A | 6/1990 | Ford et al. | |
| 4,935,143 A | 6/1990 | Kopp et al. | |
| 4,963,304 A | 10/1990 | Im et al. | |
| 4,968,733 A * | 11/1990 | Muller et al. | 210/500.21 |
| 4,999,038 A | 3/1991 | Lundberg | |
| 5,005,430 A | 4/1991 | Kibler et al. | |
| 5,015,275 A | 5/1991 | Beck et al. | |
| 5,017,292 A | 5/1991 | DiLeo et al. | |
| 5,019,260 A | 5/1991 | Gsell et al. | |
| 5,024,762 A | 6/1991 | Ford et al. | |
| 5,032,282 A | 7/1991 | Linder et al. | |
| 5,043,113 A * | 8/1991 | Kafchinski et al. | 264/41 |
| 5,049,275 A | 9/1991 | Gillberg-Laforce et al. | |
| 5,066,375 A | 11/1991 | Parsi et al. | |
| 5,066,401 A | 11/1991 | Müller et al. | |
| 5,066,402 A | 11/1991 | Anselme et al. | |
| 5,069,065 A | 12/1991 | Sprunt et al. | |
| 5,075,065 A | 12/1991 | Effenberger et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,137,633 A | 8/1992 | Wang | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,158,721 A | 10/1992 | Allegrezza, Jr. et al. | |
| 5,182,019 A | 1/1993 | Cote et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |
| 5,198,162 A * | 3/1993 | Park et al. | 264/49 |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,275,766 A | 1/1994 | Gadkaree et al. | |
| 5,286,324 A * | 2/1994 | Kawai et al. | 156/155 |
| 5,288,324 A | 2/1994 | Shaneyfelt | |
| 5,297,420 A | 3/1994 | Gilliland et al. | |
| 5,320,760 A | 6/1994 | Freund et al. | |
| 5,353,630 A | 10/1994 | Soda et al. | |
| 5,354,587 A | 10/1994 | Abayasekara | |
| 5,361,625 A | 11/1994 | Ylvisaker | |
| 5,364,527 A | 11/1994 | Zimmerman et al. | |
| 5,389,260 A | 2/1995 | Hemp et al. | |
| 5,396,019 A | 3/1995 | Sartori et al. | |
| 5,401,401 A | 3/1995 | Hickok et al. | |
| 5,403,479 A | 4/1995 | Smith et al. | |
| 5,403,483 A * | 4/1995 | Hayashida et al. | 210/506 |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,451,317 A | 9/1995 | Ishida et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,491,023 A | 2/1996 | Tsai et al. | |

| | | | | | | |
|---|---|---|---|---|---|---|
| 5,525,220 | A | 6/1996 | Yagi et al. | 6,635,104 B2 | 10/2003 | Komkova et al. |
| 5,531,848 | A | 7/1996 | Brinda et al. | 6,635,179 B1 | 10/2003 | Summerton et al. |
| 5,531,900 | A | 7/1996 | Raghaven et al. | 6,641,733 B2 | 11/2003 | Zha et al. |
| 5,543,002 | A | 8/1996 | Brinda et al. | 6,645,374 B2 | 11/2003 | Cote et al. |
| 5,547,575 | A | 8/1996 | Demmer et al. | 6,656,356 B2 | 12/2003 | Gungerich et al. |
| 5,554,283 | A | 9/1996 | Brinda et al. | 6,682,652 B2 | 1/2004 | Mahendran et al. |
| 5,607,593 | A | 3/1997 | Cote et al. | 6,685,832 B2 | 2/2004 | Mahendran et al. |
| 5,629,084 | A | 5/1997 | Moya | 6,705,465 B2 | 3/2004 | Ling |
| 5,639,373 | A | 6/1997 | Mahendran et al. | 6,721,529 B2 | 4/2004 | Chen et al. |
| 5,643,455 | A | 7/1997 | Kopp et al. | 6,723,758 B2 | 4/2004 | Stone et al. |
| 5,647,988 | A | 7/1997 | Kawanishi et al. | 6,727,305 B1 * | 4/2004 | Pavez Aranguiz ........... 524/423 |
| 5,725,769 | A | 3/1998 | Miller et al. | 6,761,013 B2 | 7/2004 | Tippey |
| 5,747,605 | A | 5/1998 | Breant et al. | 6,770,202 B1 * | 8/2004 | Kidd et al. .................. 210/650 |
| D396,046 | S | 7/1998 | Scheel et al. | 6,783,008 B2 | 8/2004 | Zha et al. |
| 5,783,083 | A | 7/1998 | Henshaw et al. | 6,790,912 B2 | 9/2004 | Blong |
| D396,726 | S | 8/1998 | Sadr et al. | 6,793,820 B1 | 9/2004 | McCray et al. |
| D400,890 | S | 11/1998 | Gambardella | 6,811,696 B2 * | 11/2004 | Wang et al. ............ 210/500.23 |
| 5,871,823 | A | 2/1999 | Anders et al. | 6,821,420 B2 | 11/2004 | Zha et al. |
| 5,906,742 | A | 5/1999 | Wang et al. | 6,830,782 B2 | 12/2004 | Kanazawa |
| 5,910,250 | A | 6/1999 | Mahendran et al. | 6,851,259 B2 | 2/2005 | Simburger et al. |
| 5,914,039 | A | 6/1999 | Mahendran et al. | 6,861,466 B2 | 3/2005 | Dadalas et al. |
| 5,918,264 | A | 6/1999 | Drummond et al. | 6,872,305 B2 | 3/2005 | Johnson et al. |
| 5,942,113 | A | 8/1999 | Morimura | 6,884,350 B2 | 4/2005 | Muller |
| 5,944,997 | A | 8/1999 | Pedersen et al. | 6,884,375 B2 | 4/2005 | Wang et al. |
| 5,958,243 | A | 9/1999 | Lawrence et al. | 6,890,435 B2 | 5/2005 | Ji et al. |
| 5,981,614 | A * | 11/1999 | Adiletta .................. 210/510.1 | 6,890,645 B2 | 5/2005 | Disse et al. |
| 5,988,400 | A | 11/1999 | Karachevtcev et al. | 6,893,568 B1 | 5/2005 | Janson et al. |
| 6,024,872 | A | 2/2000 | Mahendran | 6,965,033 B2 | 11/2005 | Otaubo |
| 6,039,872 | A | 3/2000 | Wu et al. | 6,969,465 B2 | 11/2005 | Zha et al. |
| 6,042,677 | A | 3/2000 | Mahendran et al. | 6,974,554 B2 | 12/2005 | Cox et al. |
| 6,045,698 | A | 4/2000 | Côté et al. | 6,994,867 B1 | 2/2006 | Hossainy et al. |
| 6,045,899 | A | 4/2000 | Wang et al. | 7,041,728 B2 | 5/2006 | Zipplies et al. |
| 6,048,454 | A | 4/2000 | Jenkins | 7,070,909 B2 | 7/2006 | Japp et al. |
| 6,074,718 | A | 6/2000 | Puglia et al. | 7,128,768 B2 | 10/2006 | McLaughlin |
| 6,077,435 | A | 6/2000 | Beck et al. | 7,226,541 B2 | 6/2007 | Muller et al. |
| 6,083,393 | A | 7/2000 | Wu et al. | 7,395,646 B2 | 7/2008 | Salman |
| 6,096,213 | A | 8/2000 | Radovanovic et al. | 7,449,112 B2 | 11/2008 | Lee et al. |
| 6,113,794 | A | 9/2000 | Kumara et al. | 7,459,085 B2 | 12/2008 | Koguma et al. |
| 6,146,747 | A | 11/2000 | Wang et al. | 7,537,718 B2 | 5/2009 | Mezhirov et al. |
| 6,156,200 | A | 12/2000 | Zha et al. | 7,648,034 B2 | 1/2010 | Charkoudian et al. |
| 6,159,373 | A | 12/2000 | Beck et al. | 2002/0148767 A1 | 10/2002 | Johnson et al. |
| 6,193,890 | B1 | 2/2001 | Pedersen et al. | 2003/0065302 A1 | 4/2003 | Kuroda |
| 6,202,475 | B1 | 3/2001 | Selbie et al. | 2003/0178365 A1 | 9/2003 | Zha et al. |
| 6,214,231 | B1 | 4/2001 | Cote et al. | 2003/0226797 A1 | 12/2003 | Phelps |
| 6,221,247 | B1 | 4/2001 | Nemser et al. | 2004/0084369 A1 | 5/2004 | Zha et al. |
| 6,245,239 | B1 | 6/2001 | Cote et al. | 2004/0085300 A1 | 5/2004 | Suga |
| 6,254,773 | B1 | 7/2001 | Biltoft | 2004/0092901 A1 | 5/2004 | Recca et al. |
| 6,264,839 | B1 | 7/2001 | Mohr et al. | 2004/0145076 A1 | 7/2004 | Zha et al. |
| 6,277,512 | B1 | 8/2001 | Hamrock et al. | 2004/0167490 A1 | 8/2004 | Nelson et al. |
| 6,280,626 | B1 | 8/2001 | Miyashita et al. | 2004/0167493 A1 | 8/2004 | Jarpenberg et al. |
| 6,284,135 | B1 | 9/2001 | Ookata | 2004/0168947 A1 | 9/2004 | McDonald |
| 6,294,039 | B1 | 9/2001 | Mahendran et al. | 2004/0172002 A1 | 9/2004 | Nelson et al. |
| 6,299,773 | B1 | 10/2001 | Takamura et al. | 2004/0176735 A1 | 9/2004 | Snell |
| 6,315,895 | B1 | 11/2001 | Summerton et al. | 2004/0195172 A1 | 10/2004 | Yeh |
| 6,322,703 | B1 | 11/2001 | Taniguchi et al. | 2004/0217053 A1 | 11/2004 | Zha et al. |
| 6,325,928 | B1 | 12/2001 | Pedersen et al. | 2005/0015052 A1 | 1/2005 | Klippen et al. |
| 6,337,018 | B1 | 1/2002 | Mickols | 2005/0098494 A1 | 5/2005 | Mullette et al. |
| RE37,549 | E | 2/2002 | Mahendran et al. | 2006/0157404 A1 | 7/2006 | Mullette et al. |
| 6,354,444 | B1 | 3/2002 | Mahendran | 2006/0178480 A1 | 8/2006 | Tada et al. |
| 6,375,848 | B1 | 4/2002 | Cote et al. | 2007/0007197 A1 * | 1/2007 | Mahendran et al. ......... 210/490 |
| 6,423,784 | B1 | 7/2002 | Hamrock et al. | | | |
| 6,440,303 | B2 | 8/2002 | Spriegel | | FOREIGN PATENT DOCUMENTS | |
| D462,699 | S | 9/2002 | Johnson et al. | | | |
| 6,448,062 | B1 | 9/2002 | Huth et al. | DE | 4007383 A | 9/1991 |
| 6,465,748 | B2 | 10/2002 | Yamanashi et al. | DE | 4117281 A1 | 1/1992 |
| 6,491,165 | B2 | 12/2002 | Kuske | DE | 4113420 A1 | 10/1992 |
| 6,495,041 | B2 | 12/2002 | Taniguchi et al. | DE | 4117422 C1 | 11/1992 |
| 6,524,481 | B2 | 2/2003 | Zha et al. | DE | 29906389 | 6/1999 |
| 6,550,747 | B2 | 4/2003 | Rabie et al. | EP | 012557 B1 | 2/1983 |
| 6,555,005 | B1 | 4/2003 | Zha et al. | EP | 050447 B1 | 10/1985 |
| 6,595,167 | B2 | 7/2003 | Kaesgen | EP | 229019 A3 | 7/1987 |
| D478,913 | S | 8/2003 | Johnson et al. | EP | 250337 A1 | 12/1987 |
| 6,620,319 | B2 | 9/2003 | Behmann et al. | EP | 261734 A1 | 3/1988 |

| | | |
|---|---|---|
| EP | 407900 A2 | 1/1991 |
| EP | 419396 A1 | 3/1991 |
| EP | 463627 A2 | 1/1992 |
| EP | 492942 A2 | 7/1992 |
| EP | 509663 B2 | 10/1992 |
| EP | 550798 A1 | 7/1993 |
| EP | 395133 B1 | 2/1995 |
| EP | 492446 B1 | 11/1995 |
| EP | 430082 B1 | 6/1996 |
| EP | 581168 | 10/1996 |
| EP | 763758 A1 | 3/1997 |
| EP | 911073 A1 | 4/1999 |
| EP | 920904 A2 | 6/1999 |
| EP | 1034835 A1 | 9/2000 |
| EP | 1052012 A1 | 11/2000 |
| EP | 1236503 | 9/2002 |
| FR | 2670712 | 3/1989 |
| FR | 2674448 | 10/1992 |
| FR | 2850297 A1 | 7/2004 |
| GB | 702911 | 1/1954 |
| GB | 2253572 A | 9/1992 |
| GB | 2390042 | 12/2003 |
| JP | 55-129155 | 6/1980 |
| JP | 58-088007 | 5/1983 |
| JP | 60-260628 | 12/1985 |
| JP | 61-097006 | 5/1986 |
| JP | 61-107905 | 5/1986 |
| JP | 61-192309 | 8/1986 |
| JP | 61-257203 | 11/1986 |
| JP | 61-263605 | 11/1986 |
| JP | 62-004408 | 1/1987 |
| JP | 62-068828 | 3/1987 |
| JP | 62-114609 | 5/1987 |
| JP | 62-140607 | 6/1987 |
| JP | 62-179540 | 8/1987 |
| JP | 62-250908 | 10/1987 |
| JP | 63-097634 | 4/1988 |
| JP | S63-38884 | 10/1988 |
| JP | 06-027215 | 3/1989 |
| JP | 10-75542 | 3/1989 |
| JP | 01-307409 | 12/1989 |
| JP | 02-031200 | 2/1990 |
| JP | 02-144132 | 6/1990 |
| JP | 02-164423 | 6/1990 |
| JP | 02-284035 | 11/1990 |
| JP | 03-018373 | 1/1991 |
| JP | 03-110445 | 5/1991 |
| JP | 04-187224 | 7/1992 |
| JP | 04-250898 | 9/1992 |
| JP | 04-265128 | 9/1992 |
| JP | 04-310223 | 11/1992 |
| JP | 05-023557 | 2/1993 |
| JP | 05-096136 | 4/1993 |
| JP | 05-131124 | 5/1993 |
| JP | 05-157654 | 6/1993 |
| JP | 05-285348 | 11/1993 |
| JP | 06-071120 | 3/1994 |
| JP | 06-114240 | 4/1994 |
| JP | 06-218237 | 8/1994 |
| JP | 06-285496 | 10/1994 |
| JP | 06-343837 | 12/1994 |
| JP | 07-000770 | 1/1995 |
| JP | 07-024272 | 1/1995 |
| JP | 07-155758 | 6/1995 |
| JP | 07-185268 | 7/1995 |
| JP | 07-185271 | 7/1995 |
| JP | 07-275665 | 10/1995 |
| JP | 08-010585 | 1/1996 |
| JP | 09-141063 | 6/1997 |
| JP | 09-220569 | 8/1997 |
| JP | 09-324067 | 12/1997 |
| JP | 10-156149 | 6/1998 |
| JP | 11-165200 | 6/1999 |
| JP | 11-302438 | 11/1999 |
| JP | 2000-342932 | 12/2002 |
| JP | 2004230280 | 8/2004 |
| KR | 2002031017 | 7/2002 |
| WO | WO8806200 | 8/1988 |
| WO | WO 90-00434 | 1/1990 |
| WO | WO 93-02779 | 2/1993 |
| WO | WO 93-15827 | 8/1993 |
| WO | WO 95-34424 | 12/1995 |
| WO | WO 96-07470 A1 | 3/1996 |
| WO | WO 96-41676 | 12/1996 |
| WO | WO 98-22204 | 5/1998 |
| WO | WO 98-25694 | 6/1998 |
| WO | WO 98-28066 | 7/1998 |
| WO | WO 99-01207 | 1/1999 |
| WO | WO 0043115 A1 | 7/2000 |
| WO | WO 0238256 A1 | 5/2002 |
| WO | WO 02087734 A1 | 11/2002 |
| WO | WO 03/068374 A1 * | 8/2003 |
| WO | WO03068374 | 8/2003 |
| WO | WO03080228 | 10/2003 |
| WO | WO 2004078327 A | 9/2004 |
| WO | WO 2004094049 A | 11/2004 |
| WO | WO2005002712 | 1/2005 |
| WO | WO 2005030916 A3 | 4/2005 |
| WO | WO 2006002479 A1 | 1/2006 |

OTHER PUBLICATIONS

"Fabrication of poly (ECTFE) membranes via thermally induced phase separation" by Senthilkumar Ramaswamy, Alan R. Greenberg, William B. Krantz, Journal of Membrane Science, Elsevier Scientific Publication Company, Dec. 8, 2002, pp. 175-180.
PCT International Search Report dated Sep. 13, 2005 for PCT Application No. PCT/AU2005/000961.
Almulla et al., Desalination, 153 (2002), pp. 237-243.
Anonymous, "Nonwoven Constructions of Dyneon™ THV and Dyneon™ The Fluorothermoplastics", Research Disclosure Journal, Apr. 1999, RD 420013, 2 pages.
Hall, R. (1982) Peroxides and Peroxy Compounds, Inorganic, in Kirk-Othmer Encyclopedia of Chemical Technology, vol. 17, $3^{rd}$ edition, John Wiley & Sons, p. 14-16.
Johnson, "Recent Advances in Microfiltration for Drinking Water Treatment," AWWA Annual Conference, Jun. 20-24, 1999, Chicago, Illinois, entire publication.
Kaiya et al., "Water Purification Using Hollow Fiber Microfiltration Membranes," 6th World Filtration Congress, Nagoya, 1993, pp. 813-816.
Kolthoff, I.M., et al., "The Chemistry of Persulfate—The Kinetics and Mechanism of the Decomposition of the Persulfate Ion in Aqueous Medium", Journal of the American Chemical Society, Jul. 1951, vol. 73, pp. 3055-3059.
Lloyd, D.R. et al. "Microporous Membrane Formation Via Thermally Induced Phase Separation/Solid-Liquid Phase Separation" *Journal of Membrane Science* (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Rosenberger et al., Desalination, 151 (2002), pp. 195-200.
Ueda et al., "Effects of Aeration on Suction Pressure in a Submerged Membrane Bioreactor," Wat. Res. vol. 31, No. 3, 1997, pp. 489-494.
White et al., *The Chemical Engineering Journal*, 52 (1993), pp. 73-77.
Zenon, "Proposal for ZeeWeed® Membrane Filtration Equipment System for the City of Westminster, Colorado, Proposal No. 479-99," Mar. 2000, entire publication.
Dupont Oxone Monopersulfate Compound, product literature (2008) pp. 1-3. http://ww2.dupont.com/Oxone/en_US/assets/downloads/K20101%20Oxone%20General%20Info.pdf.
International Search Report dated Sep. 13, 2005 for PCT Application No. PCT/AU2005/000961.

Extended European Search Report dated Mar. 3, 2009 for European Patent Application No. 0575700.
International Search Report dated Sep. 30, 2005 for Application No. PCT/AU2005/000975.
International Preliminary Report on Patentability dated Jun. 30, 2006 for Application No. PCT/AU2005/000975.
International Search Report dated Aug. 16, 2006 for Application No. PCT/AU2006/000997.
International Preliminary Report on Patentability dated Jun. 8, 2007 for Application No. PCT/AU2006/000997.
International Preliminary Report on Patentability dated Jul. 12, 2006 for Application No. PCT/AU2006/000864.
International Preliminary Report on Patentability dated Feb. 10, 2006 for Application No. PCT/AU2005/001820.

* cited by examiner

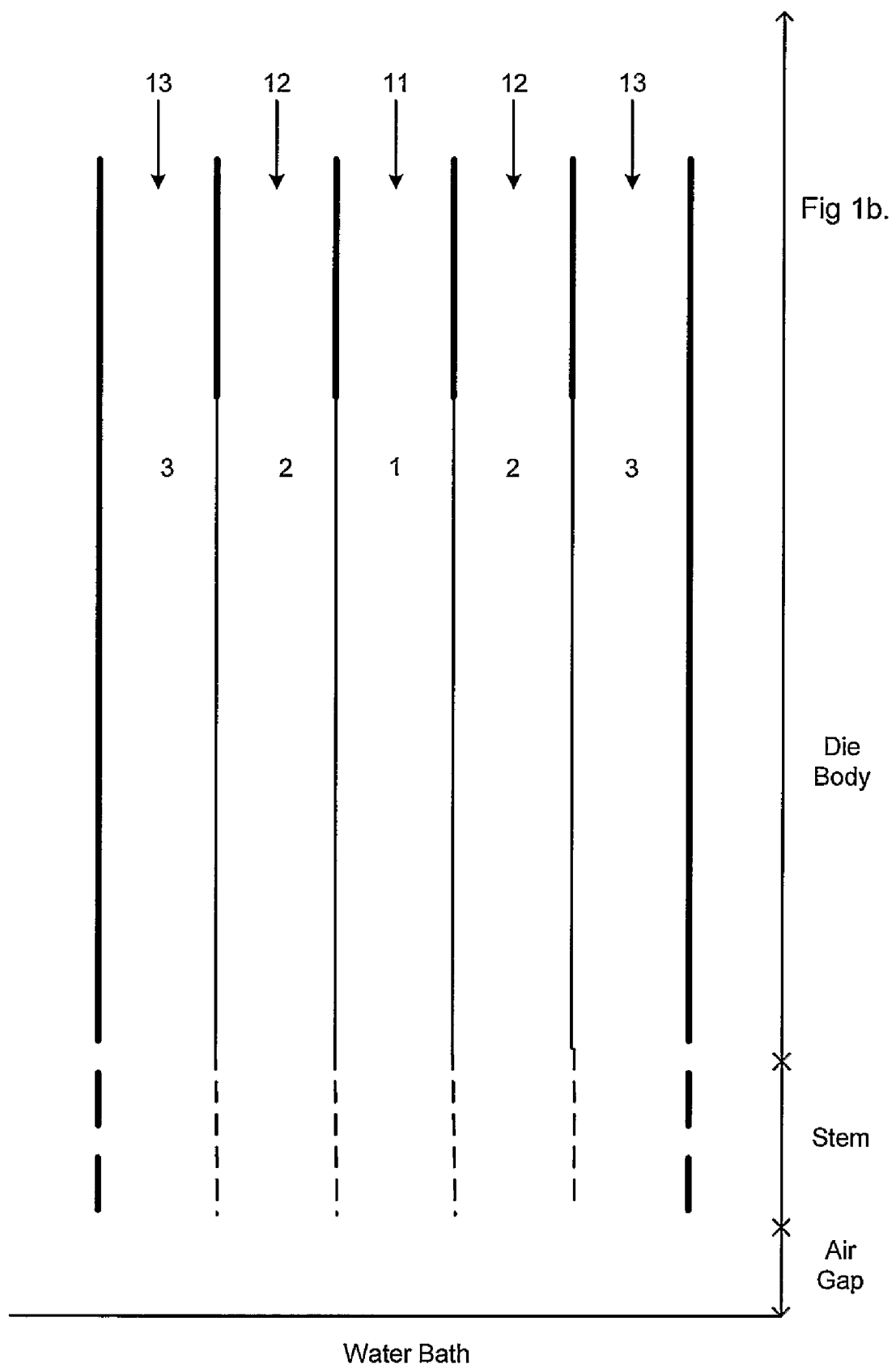

GAS TRANSFER MEMBRANE

TECHNICAL FIELD

The invention relates to the use and preparation of polymeric membranes for use in gas filtration and related applications, in particular, to Halar (ethylene chlorotrifluoroethylene copolymer, or poly (ethylene chlorotrifluoroethylene)) and related membranes in circumstances where harsh chemical environments are encountered.

BACKGROUND ART

The following is not to be construed as an admission of the common general knowledge.

Synthetic polymeric ultrafiltration and microfiltration membranes are known for a variety of applications including desalination, gas separation, filtration and dialysis. The filtration properties of the membranes depending upon features of membrane morphology such as symmetry, pore shape, pore size and on the chemical nature of the polymeric material used to form the membrane.

Microfiltration and ultrafiltration are pressure driven processes and membrane pore size correlates with the size of the particle or molecule that the membrane is capable of retaining or passing. Microfiltration can remove very fine colloidal particles in the micrometer and submicrometer range, down to 0.05 µm as a general rule, whereas ultrafiltration can retain particles as small as 0.01 µm and smaller.

Membrane gas filtration or gas transfer is also possible, allowing separation of dissolved gas from liquids. The process occurs by gas diffusion and forms the basis of, for example, transmembrane distillation, osmotic distillation, degassing, drying and adsorption. Reverse processes, such as bubbleless membrane aeration, and those processes which occur in membrane contactors, are also possible.

The chemical properties of the membrane are also highly important in the case of gas transfer membranes.

Liquids can be prevented from passing through a porous membrane given the correct combination of
i) a suitably small pore size and
ii) the required combination of hydrophilicity/hydrophobicity of the membrane and the liquid.

Thus, the size of the liquid molecules is not the limiting factor, but rather passage through the membrane is determined by the balance of liquid-liquid and liquid-membrane forces.

Gases, on the other hand, have no such problems passing through a membrane as they have no surface tension, and so will pass through a membrane pore of any size larger than the size of the molecules (which is typically of the order of 0.1 nm), provided the diffusion conditions are appropriate (ie gas will not diffuse into a region of higher pressure) and provided there is no adsorption onto the membrane wall.

Hydrophilic liquids (such as aqueous solutions) will not pass through hydrophobic membranes with a small pore size, and nor will hydrophobic liquids pass through hydrophilic membranes which have a small size. Water for instance has a very small molecular size, but requires high pressure to pass through small pores in hydrophobic membranes due to surface tension. As pore size of hydrophobic membranes decreases, greater pressures are required to force water through the membrane.

Water can be forced through a hydrophobic membrane by use of sufficient pressure, but the pressure needed is very high, 150-300 psi for micro-ultrafiltration membranes. Membranes are likely to be damaged at such pressures and in any case generally do not become wetted evenly. Accordingly, when used in water filtration applications, hydrophobic membranes need to be hydrophilised or "wet out" with agents such as ethanol or glycols to allow water permeation. Gas filtration membranes of course are better if the membranes are not wetted out and the hydrophobic nature of the polymer is retained.

Gas filtration is often required in processes which employs very severe conditions. For example, it is useful in the electronics industry, for the stripping of HF gas or the degassing of caustic solution prior to use, or in the area of chlorine/alkaline electrolysis where a membrane needs to withstand hot concentrated caustic or acid in combination with chlorine. Many conventional materials used in membrane fabrication are unable to withstand such high levels of chemical attack, even if they can be formed in a manner which produces pores of a suitably small size.

Even degassing tap water to remove low concentrations of dissolved chlorine used to kill bacteria can expose membranes to large amounts of chlorine over the working life of a membrane by virtue of the high throughput. Eventually, the membrane can exhibit yellowing or turn brittle, signs of degradation of the membrane.

Currently, poly(tetrafluoroethylene) (PTFE), polyethylene (PE), polypropylene (PP) and poly(vinylidene fluoride) (PVDF) are the most popular and available hydrophobic membrane materials.

PVDF exhibits a number of desirable characteristics for membrane applications, including thermal resistance, reasonable chemical resistance (to a range of corrosive chemicals, including sodium hypochlorite), and weather (UV) resistance.

While PVDF has to date proven to be the most desirable material from a range of materials suitable for microporous membranes, the search continues for membrane materials which will provide better chemical stability and performance while retaining the desired physical properties required to allow the membranes to be formed and worked in an appropriate manner.

The limitation of gas filtration membranes has been their poor stability in very harsh chemical environments and at elevated temperatures. The search continues for membrane materials that will provide better chemical stability and performance while retaining the desired physical properties required to allow the membranes to be formed and worked in an appropriate manner.

It is an object of the present invention to overcome or ameliorate at least one of the disadvantages of the prior art, or to at least provide a commercial alternative.

DESCRIPTION OF THE INVENTION

Accordingly, in a first aspect the invention provides a polymeric membrane formed from a resistant hydrophobic membrane, in which the pores are of a size sufficient to permit gas permeation without permitting the flow of a hydrophilic fluid across the membrane.

The invention also provides a polymeric membrane formed from a resistant hydrophobic membrane, in which the pores are of a size sufficient to permit vapour permeation without permitting the flow of a hydrophilic fluid across the membrane.

Accordingly, in a second aspect the invention provides a polymeric membrane formed from halar, in which the pores are sized sufficient to permit gas permeation without permitting the flow of liquid water molecules across the membrane.

Halar, or poly (ethylene chlorotrifluoroethylene), is a 1:1 alternating copolymer of ethylene and chlorotrifluoroethylene, which has the following structure:

$$-(-CH_2-CH_2-CFCl-CF_2-)_n-$$

While the embodiments of the invention are described herein with respect to Halar, this term is used herein to encompass Halar equivalents, such as $$-(-(CH_2-CH_2-)_m-CX_2-CX_2-)_n-$$

wherein each X is independently selected from F or Cl, and where m is chosen so as to be between 0 and 1, so as to allow the ethylene portion of the polymer to range from 0 to 50%. An example of a Halar equivalent is PCTFE.

Preferably, the pores are in the range 0.05 µm to 5 µm, more preferably 0.1 µm to 1 µm and most preferably 0.1 µm to 0.5 µm Preferably, the membranes of the present invention are asymmetric membranes, which have a large pore face and a small pore face, and a pore size gradient which runs across the membrane cross-section. The membranes may be flat sheet, or more preferably, hollow fibre membranes.

Preferably the membrane is of the form of a hollow fibre membrane. More preferably the invention is prepared by the TIPS (thermally induced phase separation) process.

Preferably the membrane is used in one or more processes selected from the group consisting of trans-membrane distillation, osmotic distillation, degassing, drying, adsorption, bubbleless membrane aeration or in membrane contactors.

Membrane contactors have two or more fluids (gas or liquids) separated by a porous membrane. The fugacity of dissolved gas will result in diffusion from the gas rich to the gas poor side of the membrane.

Such membranes can also be used to separate two liquids, or used to separate water vapour from carbon dioxide.

Preferably the present invention is used in environments where there are severe or harsh conditions requiring a high level of chemical stability.

Preferred process include the stripping of HF gas or the degassing of caustic solution prior to use, or in the area of chlorine/alkaline electrolysis where a membrane needs to withstand concentrated caustic or acid in combination with chlorine, degassing tap water to remove dissolved chlorine. It is expected to be useful in a number of industries, including the electronics industry.

Surprisingly, it has been found by the present invention that halar can be formed into membranes having such extremely small pores. This is unusual for such a hydrophobic material and unusual for membranes prepared by the TIPS process.

Halar also, surprisingly can be formed with a narrow range of pore size distributions, ie the pores can, if desired, be made consistently small. This enables the preparation of membranes with small pore sizes but relatively high porosities, of the order of up to 70% or even 80% or above.

Preferably, the gas filtration membrane including Halar is formed without the use of toxic solvents, or solvents of dubious or unproven safety. The membranes may be preferably flat sheet, or, more preferably hollow fibres.

Preferably, the gas filtration membrane is formed by the TIPS (Thermally Induced Phase Separation) process and has an asymmetric pore size distribution. Most preferably, the Halar gas filtration membrane has an asymmetric cross section, a large-pore face and a small-pore face.

Preferably, the pore size of the gas filtration membrane is chosen in combination with the polarity of the membrane material to provide a gas filtration membrane.

Preferably, the pores are in the range 0.05 µm to 5 µm, more preferably 0.1 µm to 1 µm and most preferably 0.1 µm to 0.5 µm. Any suitable pore size can be chosen depending upon the hydrophobicity of the solution to be degassed, the membrane hydrophobicity and the anticipated working pressures involved. They may be chosen so as to be as large as possible to retain the liquid in the membrane pores at the working pressure, or any value smaller depending upon practical considerations-pore size may depend upon the method of membrane preparation and may be dictated by the speed at which separation is desired.

Pore size can be determined by the so called bubble point method.

According to a third aspect, the invention provides a gas filtration membrane formed from Halar and prepared from a solution containing one or more compounds according to formula I or formula II:

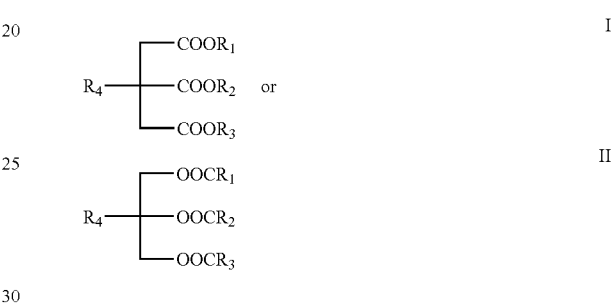

wherein $R_1$, $R_2$ and $R_3$ are independently methyl, ethyl, propyl, butyl, pentyl, hexyl or other alkyl.

$R_4$ is H, OH, $COR_5$, $OCOR_5$, methyl, ethyl, propyl, butyl, pentyl, hexyl or other alkyl, methoxy, ethoxy, propoxy, butoxy, pentoxy, hexoxy or other alkoxy, $R_5$ methyl, ethyl, propyl, butyl, pentyl, hexyl or other alkyl. Preferably, $R_1=R_2=R_3=$ethyl and $R_4=$H.

Preferably, the compounds above act as pore controlling agents and are more preferably citric acid ethyl ester (Citroflex™-2) or glycerol triacetate.

Such compounds may be used as polymer solvents, either alone, in mixtures of the above compounds, or in conjunction with other appropriate agents.

The gas filtration or microfiltration of the present invention may be either hydrophobic or hydrophilic, and may include other materials compatible with the base polymeric material which is preferably Halar. Hydrophobic membranes are preferred for use with aqueous solutions, hydrophilic membranes are preferred for use with non polar solutions.

Additional species adapted to modify the chemical behaviour of the membrane may also be added. In one highly preferred alternative, the gas filtration membrane of the present invention further including modifying agent to modify the hydrophilicity/hydrophobicity balance of the membrane. This can result in a porous polymeric membrane which is hydrophilic or alternatively, a porous polymeric membrane which is hydrophobic.

Preferably, the porous polymeric gas filtration membranes of the present invention have good macroscopic integrity, uniform wall thickness and high mechanical strength (for example, the breakforce extension is greater than 1.3N).

According to a fourth aspect, the present invention provides a method of making a gas filtration material comprising the steps of:
(a) heating a mixture comprising Halar and a solvent system initially comprising a first component that is a latent solvent for Halar and optionally a second component that is a non-solvent for Halar wherein, at elevated temperature, Halar dissolves in the solvent system to provide an optically clear solution, (b) rapidly cooling the solution so that non-equilibrium liquid-liquid phase separation takes place to form a continuous polymer rich phase and a continuous polymer lean phase with the two phases being intermingled in the form of bicontinuous matrix of large interfacial area, (c) continuing cooling until the polymer rich phase solidifies;

(d) removing the polymer lean phase from the solid polymeric material; and wherein the conditions are selected to achieve a pore size which in combination with membrane polarity provides a gas filtration membrane.

According to a fifth aspect, the invention provides a method of manufacturing a microfiltration or ultrafiltration membrane including the step of casting a membrane from a polymer composition including Halar According to a sixth aspect, the invention provides a method of forming a hollow fibre Halar membrane comprising:

forming a blend of Halar with a compatible solvent;
forming said blend into a shape to provide a hollow fibre;
contacting an internal lumen surface of said blend with a lumen forming fluid;
inducing thermally induced phase separation in said blend to form a hollow fibre membrane;
removing the solvent from the membrane; and
wherein the conditions are selected to achieve a pore size which in combination with membrane polarity provides a gas filtration membrane.

Preferably, the Halar is present in the blend in an amount ranging from 14-25%, and most preferably around 16-23%. Preferably, the lumen forming fluid is digol. In highly preferred embodiments, the process is conducted at elevated temperatures, preferably above 200° C., and more preferably above 220° C.

According to an seventh aspect, the invention provides a method of forming a hollow fibre Halar membrane comprising:

forming a blend of Halar with a compatible solvent;
forming said blend into a shape to provide a hollow fibre;
contacting an external surface of said blend with a coating fluid;
contacting an internal lumen surface of said blend with a lumen forming fluid;
inducing thermally induced phase separation in said blend to form a hollow fibre membrane;
extracting the solvent from the membrane; and
wherein the conditions are selected to achieve a pore size which in combination with membrane polarity provides a gas filtration membrane.

The present invention relates to the use of Halar for forming a gas filtration membrane and to a porous polymeric Halar gas filtration membranes when prepared by any of the preceding aspects.

The term "environmentally friendly" as used herein refers to materials having a lesser or reduced effect on human health and the environment when compared with competing products or services that serve the same purpose. In particular, "environmentally friendly" refers to materials which have low toxicity to plants and animals, especially humans. Environmentally friendly also encompasses biodegradable materials.

Preferably, the environmentally friendly solvents used in the present invention are not recognised as hazardous to the health of humans or other organisms, either when subject exposure is acute (short term/high dose) or long term (typically at a lower dose).

It is preferable that the acute toxicity of the solvents used in the present invention be low, ie it is preferable if the solvents have a high LD50. Preferably in the present invention, the LD50 is above 1000 mg/kg, and more preferably above 2000 mg/kg However, as well as acute toxicity, it is also highly desirable that the solvents do not show long term, low level exposure effects, and are not carcinogenic, mutagenic or teratogenic. This will not so much be reflected by their LD50's (although these are a factor), but reflects factors such as the ability of the solvent to bioaccumulate as well as its inherent toxic and mutagenic properties. Preferably, the solvents of the present invention do not bioaccumulate. In this regard, the biodegradability of the solvent is important, and high biodegradability is preferred.

It is also necessary to consider other ecotoxicological effects such as the toxicity to non-humans/non-mammals, and factors such as whether the solvent is an ozone depleting compound.

In terms of structural considerations, the type of structural features which may be found in suitable environmentally friendly solvents include the presence of degradable groups, eg hydrolysable groups, such as esters, (especially when these result in much smaller molecules, such as C4 or less); absence of halogens (such as chlorine); and the absence of aromatic rings. The preferred solvents of the present invention exhibit these three favourable characteristics

BEST METHOD OF PERFORMING THE INVENTION

Halar, or poly (ethylene chlorotrifluoroethylene), is a 1:1 alternating copolymer of ethylene and chlorotrifluoroethylene, which has the following structure:

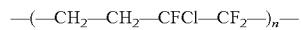

While the embodiments of the invention are described herein with respect to Halar, this term is used herein to encompass Halar equivalents, such as

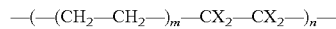

wherein each X is independently selected from F or Cl, and where m is chosen so as to be between 0 and 1, so as to allow the ethylene portion of the polymer to range from 0 to 50%. An example of a Halar equivalent is PCTFE. It has been known for some time to produce flat sheet Halar membranes. The properties of Halar make it highly desirable in the field of ultrafiltration and microfiltration. In particular, Halar has extremely good properties in relation to its resistance both to chlorine and to caustic solutions, as well as ozone and other strong oxidising agents.

A Halar microfiltration membrane in the form of a hollow fibre was prepared according to the method disclosed in PCT AU94/00198 (WO 94/17204) and AU 653528, the contents of which are incorporated herein by reference.

In the present case the inventors have sought to find a way to modify membranes made from halogenated polymer such as Halar to enhance the range of applications in which they may be used, while at the same time, retaining the good intrinsic resistance of the material to chemical, physical and mechanical degradation The gas transfer membranes of the present invention are particularly suitable for use in hollow fibres and are produced by phase inversion.

Hollow fibre ultrafiltration and microfiltration membranes are generally produced by either diffusion induced phase separation (the DIPS process) or by thermally induced phase separation (the TIPS process).

The TIPS process is described in more detail in PCT AU94/00198 (WO 94/17204) AU 653528, the contents of which are incorporated herein by reference.

The quickest procedure for forming a microporous system is thermal precipitation of a two component mixture, in which the solution is formed by dissolving a thermoplastic polymer in a solvent which will dissolve the polymer at an elevated temperature but will not do so at lower temperatures. Such a solvent is often called a latent solvent for the polymer. The solution is cooled and, at a specific temperature which depends upon the rate of cooling, phase separation occurs and the polymer rich phase separates from the solvent. In one process of the present invention, halar is dissolved in an appropriate solvent, or an appropriate solvent/non solvent combination, and a suitable viscosity of the solution is achieved. The polymer solution can be cast as a film or hollow fibre, and then immersed in precipitation bath such as water. This causes separation of the homogeneous polymer solution into a solid polymer and liquid solvent phase. The precipitated polymer forms a porous structure containing a network of uniform pores. Production parameters that affect the membrane structure and properties include the polymer concentration, the precipitation media and temperature and the amount of solvent and non-solvent in the polymer solution.

These factors can be varied to produce microporous membranes with a large range of pore sizes (from than 0.1 µm down to 0.005 µm). Surprisingly, these membranes have been found to be good gas filtration membranes.

All practical thermal precipitation methods follow this general process which is reviewed by Smolders et al in Kolloid Z.u.Z Polymer, 43, 14-20 (1971). The article distinguishes between spinodal and binodal decomposition of a polymer solution.

The equilibrium condition for liquid-liquid phase separation is defined by the binodal curve for the polymer/solvent system. For binodal decomposition to occur, the solution of a polymer in a solvent is cooled at an extremely slow rate until a temperature is reached below which phase separation occurs and the polymer rich phase separates from the solvent.

It is more usual for the phases not to be pure solvent and pure polymer since there is still some solubility of the polymer in the solvent and solvent in the polymer, there is a polymer rich phase and a polymer poor phase. For the purposes of this discussion, the polymer rich phase will be referred to as the polymer phase and the polymer poor phase will be referred to as the solvent phase.

When the rate of cooling is comparatively fast, the temperature at which the phase separation occurs is generally lower than in the binodal case and the resulting phase separation is called spinodal decomposition. According to the process disclosed in U.S. Pat. No. 4,247,498, the relative polymer and solvent concentrations are such that phase separation results in fine droplets of solvent forming in a continuous polymer phase. These fine droplets form the cells of the membrane. As cooling continues, the polymer freezes around the solvent droplets.

As the temperature is lowered, these solubilities decrease and more and more solvent droplets appear in the polymer matrix. Synersis of the solvent from the polymer results in shrinkage and cracking, thus forming interconnections or pores between the cells. Further cooling sets the polymer. Finally, the solvent is removed from the structure.

Known thermal precipitation methods of porous membrane formation depend on the polymer rich phase separating from the solvent followed by cooling so that the solidified polymer can then be separated from the solvent. Whether the solvent is liquid or solid when it is removed from the polymer depends on the temperature at which the operation is conducted and the melting temperature of the solvent.

True solutions require that there be a solvent and a solute. The solvent constitutes a continuous phase and the solute is uniformly distributed in the solvent with no solute-solute interaction. Such a situation is almost unknown with the polymer solutions. Long polymer chains tend to form temporary interactions or bonds with other polymer chains with which they come into contact. Polymer solutions are thus rarely true solutions but lie somewhere between true solutions and mixtures.

In many cases it is also difficult to state which is the solvent and which is the solute. In the art, it is accepted practice to call a mixture of polymer and solvent a solution if it is optically clear without obvious inclusions of either phase in the other. By optically clear, the skilled artisan will understand that polymer solutions can have some well known light scattering due to the existence of large polymer chains. Phase separation is then taken to be that point, known as the cloud point, where there is an optically detectable separation. It is also accepted practice to refer to the polymer as the solute and the material with which it is mixed to form the homogeneous solution as the solvent.

In the present case the inventors have sought to find a way to prepare Halar membranes with extremely small pore sizes which may be suitable for gas filtration.

It has been known for some time to produce flat sheet Halar membranes, and the processes are disclosed in U.S. Pat. No. 4,702,836, for example. The previous methods were not amenable to producing hollow fibres and moreover, utilised solvents which are highly toxic with high environmental impact, such as 1,3,5-trichlorobenzene, dibutyl phthalate and dioctyl phthalate.

The properties of Halar make it highly desirable in the field of gas filtration. In particular, Halar is very hydrophobic (more hydrophobic than PVDF, for instance) and has extremely good properties in relation to its resistance both to chlorine and to caustic solutions, but also to ozone and other strong oxidising agents. It is preferred to prepare Halar gas transfer membranes without the use of highly toxic solvents.

As most of the gas/liquid transfer applications involve the separation of a gas from an aqueous or polar phase, it is desirable that the membrane is hydrophobic. This means that liquids, mainly aqueous solutions, with a high surface tension cannot permeate through the pores of the membrane. However, because gas has no surface tension, gas which is dissolved in the liquid or liquid vapour can permeate through the pores membranes wall. Diffusion will take place at neutral pressures, or faster if an appropriate pressure differential is applied across the membrane. For instance, the application of a slight negative pressure will draw the gas through the membrane.

Gas filtration membranes can also be used to pass gas into the liquid in a micro-disperse fashion with little or no resistance from the liquid. The application of a slight positive pressure can speed up the process of gassing a liquid.

Hydrophobic microporous membranes are typically characterised by their excellent chemical resistance, biocompatibility, low swelling and good separation performance.

As mentioned, the microstructure of gas filtration membranes is asymmetric, that is, the pore size gradient across the membrane is not homogeneous, but rather varies in relation to the cross-sectional distance within the membrane. Hollow fibre membranes are preferably asymmetric membranes possessing tightly bunched small pores on one or both outer surfaces and larger more open pores towards the inside edge of the membrane wall.

This asymmetric microstructure has been found to be advantageous as it provides a good balance between mechanical strength and filtration efficiency.

As a general principle, a large surface area is needed when a large filtrate flow is required. A commonly used technique to minimize the size of the apparatus used is to form a membrane in the shape of a hollow porous fibre. In the present case, one apparatus according to the present invention has a large number of these hollow fibres (up to several thousand) bundled together and housed in modules. The fibres act in parallel to remove gas from a solution, generally an aqueous solution, which flows in contact with the outer surface of all the fibres in the module. In gas filtration, the gas is forced into the central channel, or lumen, of each of the fibres while the water and other dissolved materials remain trapped outside the fibres. The filtered gas collects inside the fibres and is drawn off through the ends, or may be removed simply by blowing out, as moving air creates low pressure that can assist in drawing air flow through the membrane.

The fibre module configuration is a highly desirable one as it enables the modules to achieve a very high surface area per unit volume.

Membranes made according to the present invention possess good pH (acid and base) and oxidation (Chlorine, Ozone etc) resistant properties.

While the invention has been described with reference to particular embodiments, it will be understood by those skilled in the art that the inventive concept disclosed herein is not limited only to those specific embodiments disclosed.

BRIEF DESCRIPTION OF THE DRAWINGS

FIG. 1a and 1b are diagrams of alternative TIPS processes used to prepare HF membranes The TIPS process is described in more detail in PCT AU94/00198 (WO 94/17204) AU 653528, the contents of which are incorporated herein by reference. One preferred method used to prepare the membranes of the present invention is described herein in simplified form.

Figure 1A:
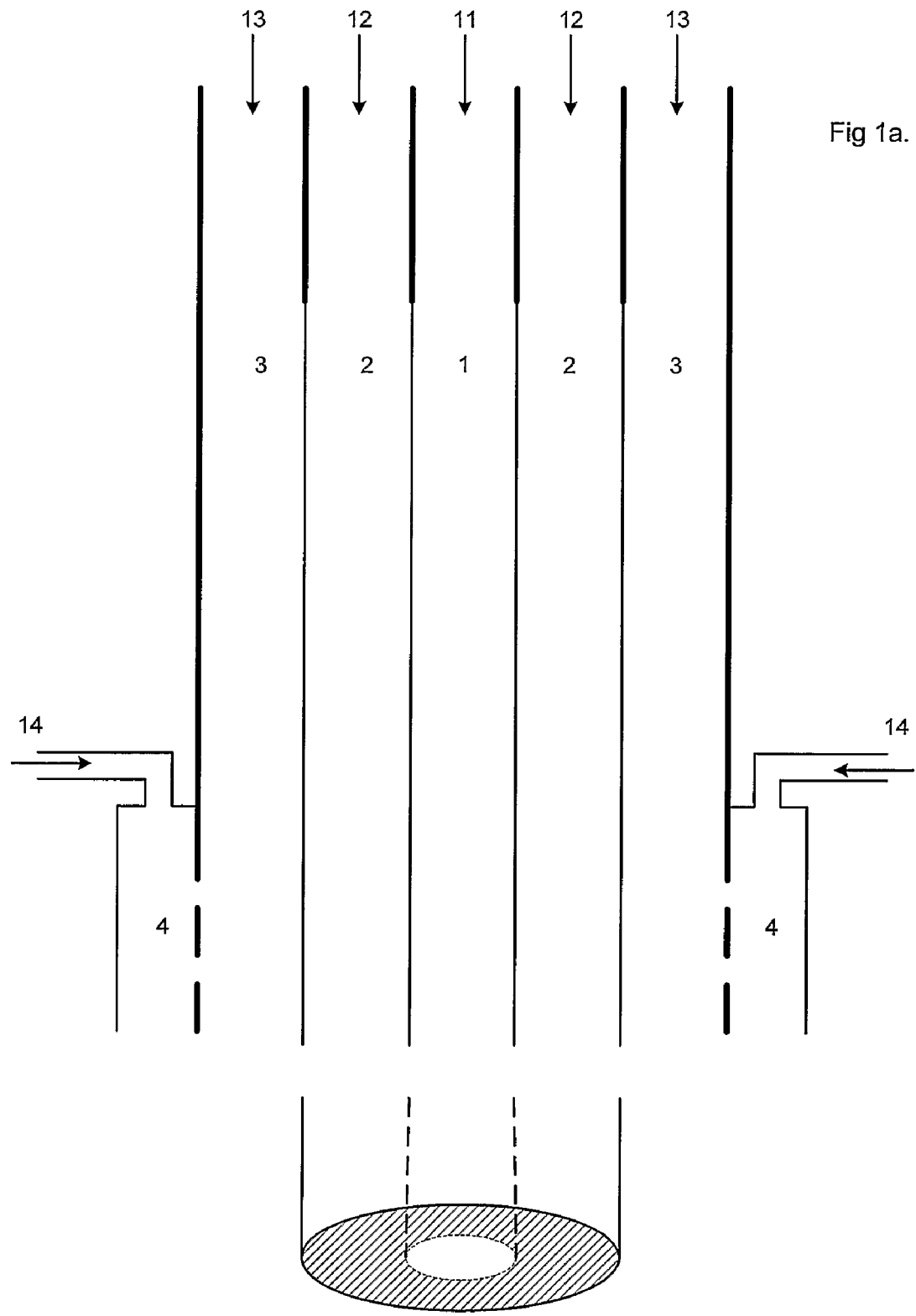

In one preferred form of the invention, poly (ethylene chlorotrifluoroethylene) is formed as a hollow fibre. The poly (ethylene chlorotrifluoroethylene) is dissolved in a suitable solvent and then passed through an annular co-extrusion head.

Hollow Fibre Preparation

There are two possible ways to conduct the methods of the present invention in relation to hollow fibres. One is via a co extrusion head having three concentric passageways, as shown in cross section FIG. 1b, the other is via a quadruple co-extrusion head having four concentric passageways is shown in cross section in FIG. 1a. The principle is broadly the same in both cases, except for the way the quench fluid is contacted with the fibre.

In both cases, the axial passageway 1 may contain a lumen forming fluid 11. The first outwardly concentric passageway 2 contains a homogenous mixture of the polymer and solvent system 12 to form the membrane, the next outwardly concentric passageway 3 has a coating fluid 13. In the case of the triple extrusion head, the quench is a bath either directly adjacent the extrusion head or slightly spaced below it with an intermediate air gap. In the quadruple extrusion head, the outermost passageway 4 applies a quench fluid 14 to the fibre.

Under carefully thermally controlled conditions, the lumen forming fluid, the membrane forming solution and the coating fluid are coating fluid are contacted with a quench fluid at a predetermined temperature (and flow rate, if the quench is applied by means of an outermost concentric passageway). The poly (ethylene chlorotrifluoroethylene) solution comes into contact with the lumen forming fluid on the inside of the hollow fibre and with the coating fluid and/or quench bath solution on the outside of the hollow fibre.

The lumen and coating fluids contain one or more components of the solvent system, alone or in combination with other solvents, in selected proportions (the first component may be absent). The composition of the coating and lumen fluids predetermine the pore size and frequency of pores on the membrane surfaces.

Each fluid is transported to the extrusion head by means of individual metering pumps. The three components are individually heated and are transported along thermally insulated and heat traced pipes. The extrusion head has a number of temperature zones. The lumen fluid, membrane forming solution (dope) and coating fluid are brought to substantially the same temperature in a closely monitored temperature zone where the dope is shaped. As mentioned above, the exact nature of the quench depends on whether the quadruple or triple extrusion head is used. In the quadruple, the quench fluid is introduced via an outer concentric passageway. The fibre may travel down the quench tube at a significantly different linear speed from the quench fluid. The fibre may then pass into a further quantity of quenching fluid if desired.

In the triple extrusion system, the fibre passes out of the die, which may be optionally in the shape of a stem to assist in determining fibre structure. The fibre may pass through an optional air gap before passing into a quench bath. Most fibres disclosed herein were prepared by the triple extrusion head, as will be clear by the inclusion of an air gap distance in the production parameters.

When the quench fluid is contacted with the dope, the dope undergoes non-equilibrium liquid-liquid phase separation to form a bicontinuous matrix of large interfacial area of two liquids in which the polymer rich phase is solidified before aggregated separation into distinct phases of small interfacial area can take place.

Preferably, any air, gas or vapour (not being a gas or vapour that serves as the lumen fluid), is excluded during extrusion and the fibre is stressed axially to stretch it by a factor ranging from 1.5 to 5, thereby elongating the surface pores.

The hollow fibre membrane leaves the extrusion head completely formed and there is no need for any further formation treatment except for removing the solvent system from the membrane in a post-extrusion operation that is common to membrane manufacturing process. In a preferred method, an appropriate solvent that does not dissolve the polymer but is miscible with the dope solvents is used to remove the solvent system for the polymer from the finished membrane.

The lumen forming fluid may be selected from a wide variety of substances such as are disclosed herein. The same substance may be used as the coating and quenching liquids. Water or virtually any other liquid may be used as the quench liquid. Water is used if a highly asymmetric structure is desired.

Asymmetric membranes can on rare occasions result from the TIPS process. The rate and speed of de-mixing occurs faster at the outer surface of the membrane and slower further away from the interface. This results in a pore size gradient with smaller pores at the surface and larger pores further inwards. The pores at the interface which in a hollow fibre are the outer layer of the fibre and the wall of the lumen may, in some circumstances, be so small that a "skin" region occurs. This is about one micron thick and is the critical region for filtration. Thus, the outside of the fibre is small pored whereas the centre of the polymeric region has large pore size.

The poly (ethylene chlorotrifluoroethylene) membranes were prepared by extrusion into a water quench, using either glycerol triacetate (GTA) or Citroflex 2 as the solvent. The structure of the membranes as observed by SEM appeared to be excellent, although there was some degree of skinning.

A poly (ethylene chlorotrifluoroethylene) membrane was prepared by extrusion in the manner described above for the TIPS process. The dope was prepared from either citroflex or GTA solvent (21-24% polymer dope) and coated with either citroflex or GTA. SEMs of the sample made with no coating had an impermeable skin and artificially high break extension (BE) and break force (BF) values.

The GTA sample had a high bubble point, indicating that many smaller pores rather than a smaller number of larger pores provide the high flow. The Citroflex 2 coated membrane can be seen in the SEM's to have a good pore structure.

Thus, Using GTA as a coating for the Halar fibres provides a remarkable amount of control over both the structure and porosity of the fibre surface. A lower coating flow rate still seems to keep the fibre permeable and enhances the asymmetry, whereas a higher coating flow rate gives a far more open surface. It is interesting is that the permeability of the 1 cc/min samples is not vastly different from the 5 cc/min samples, yet the fibre surface appears far less porous. This suggests that the internal pore size is very small. Thus if the surface porosity is controlled accurately then either the polymer concentration can be decreased or Citroflex 2 used as a solvent to increase the permeability, all while maintaining excellent bubble point/retention characteristic of the fibre.

Flat Sheet Preparation

Approximately 160 g of solvent (GTA or Citroflex 2) was placed into a glass reaction vessel with a thermocouple to control the temperature. Stirring continuously, the solvent was heated to 230° C. before approximately 40 g of Halar 901LC was added to the vessel. The polymer dissolved rapidly and was allowed to mix for 10-15 minutes before a sample of polymer solution was poured from the flask and onto a glass plate preheated to 120° C. The dope was then rapidly spread across the plate with a glass bar also preheated to 120° C. The bar had adhesive tape wound around the ends to raise it a uniform height above the plate when drawing the dope down, thus a sheet of uniform thickness was obtained. The cast membrane rapidly cooled and solidified to form a flat membrane sheet, which was washed in ethanol and dried in air.

Halar membranes were prepared as described above. Approximately 21% Halar in GTA solvent was used, at a flow rate of 22-35 cc/min, with a lumen flow of 5 cc/min digol. Coating was optional, but when used was either citroflex 2 or GTA at 10 cc/min. The whole was quenched in water. Wall thickness of the asymmetric membranes was 150-250 µm. Break extension was good (in excess of $^{90}$%), BF(N) about 1.3, PB(kPa) around 490 and stress around 4.5 Mpa.

While the invention has been described with reference to particular embodiments, it will be understood by those skilled in the art that the inventive concept disclosed herein is not limited only to those specific embodiments disclosed.

The claims defining the invention are as follows:

1. A hydrophobic porous polymeric gas transfer membrane comprising poly(ethylene chlorotrifluoroethylene), having membrane pores in the range of 0.05 microns to 5 microns, a porosity of 70% to 80%, and a wall thickness of 150 microns to 250 microns, wherein the pores permit the flow of gas and/or vapour across the gas transfer membrane without permitting the flow of a hydrophilic fluid across the membrane.

2. The porous polymeric membrane according to claim 1, wherein membrane pore size is chosen so as to permit gas and/or vapour permeation without permitting the flow of liquid water molecules.

3. The porous polymeric membrane according to claim 1, wherein membrane pore size is chosen in combination with membrane material polarity to provide a gas filtration membrane.

4. The porous polymeric membrane according to claim 1 wherein the pore sizes are in the range 0.1 µm to 1 µm.

5. The porous polymeric membrane according to claim 4, wherein the pore sizes are in the range 0.1 µm to 0.5 µm.

6. The porous polymeric membrane according to claim 1, in the form of a flat sheet.

7. The porous polymeric membrane according to claim 1, in the form of a hollow fibre membrane.

8. The porous polymeric membrane according to claim 1, used in one or more processes selected from the group consisting of transmembrane distillation, osmotic distillation, degassing, drying, adsorption, and bubbleless membrane aeration.

9. The porous polymeric membrane according to claim 1, for use as a gas filtration membrane.

10. The porous polymeric membrane according to claim 1, for use in stripping HF gas.

11. The porous polymeric membrane according to claim 1, for use in degassing of caustic solution.

12. The porous polymeric membrane according to claim 1, for use in chlorine gas/alkaline filtration.

13. The porous polymeric membrane according to claim 1, for use in degassing tap water to remove dissolved chlorine.

14. The porous polymeric membrane according to claim 1, for use in a membrane contactor.

15. The porous polymeric membrane according to claim 1, free from toxic solvent residue.

* * * * *